US006823738B1

United States Patent
Wlodarczyk et al.

(10) Patent No.: US 6,823,738 B1
(45) Date of Patent: Nov. 30, 2004

(54) TEMPERATURE COMPENSATED FIBER-OPTIC PRESSURE SENSOR

(76) Inventors: Marek T. Wlodarczyk, 6865 Vachon Dr., Bloomfield Hills, MI (US) 48301; Thomas J. Poorman, 1616 N. Hacker Rd., Howell, MI (US) 48843

( * ) Notice: Subject to any disclaimer, the term of this patent is extended or adjusted under 35 U.S.C. 154(b) by 0 days.

(21) Appl. No.: 10/686,500

(22) Filed: Oct. 15, 2003

Related U.S. Application Data

(63) Continuation of application No. 10/030,260, filed as application No. PCT/US00/18683 on Apr. 12, 2002, now abandoned.

(51) Int. Cl.[7] ............................................. G01L 9/00
(52) U.S. Cl. ............................................. 73/705; 73/715
(58) Field of Search ........................... 73/705, 715, 718, 73/721, 652–654

(56) References Cited

U.S. PATENT DOCUMENTS 5,600,070 A  *  2/1997  Wlodarczyk ............... 73/715
6,131,465 A  *  10/2000  Wlodarczyk et al. ......... 73/715
6,738,145 B2 * 5/2004  Sherrer et al. ............. 356/480

FOREIGN PATENT DOCUMENTS

JP  62012827 A  *  1/1987 ........... G01L/23/06

* cited by examiner

Primary Examiner—Edward Lefkowitz
Assistant Examiner—Jermaine Jenkins
(74) Attorney, Agent, or Firm—James M. Deimen

(57) ABSTRACT

Compensation techniques for high temperature fiber-optic pressure sensors are aimed at correcting for the sensor sensitivity and offset dependence on temperature. By using materials of different thermal expansion coefficients for the sensor diaphragm, housing, ferrule and fiber-bonding compound and by optimizing the length of such parts, the relative distance of the fiber tip with respect to the sensing diaphragm changes in a manner that reduces sensor sensitivity and/or offset dependence on temperature. In the first embodiment, the distance change results from controlled fiber movement within the ferrule and is used to reduce the temperature sensitivity of dynamic sensors. In the second embodiment, an optimum selection of the diaphragm, housing, ferrule and bonding compound materials yields a stable fiber position within the ferrule but, instead, a well defined ferrule movement with respect to the diaphragm in response to temperature changes. The latter technique is used to reduce the offset error of static sensors or the sensitivity error of dynamic sensors.

4 Claims, 2 Drawing Sheets

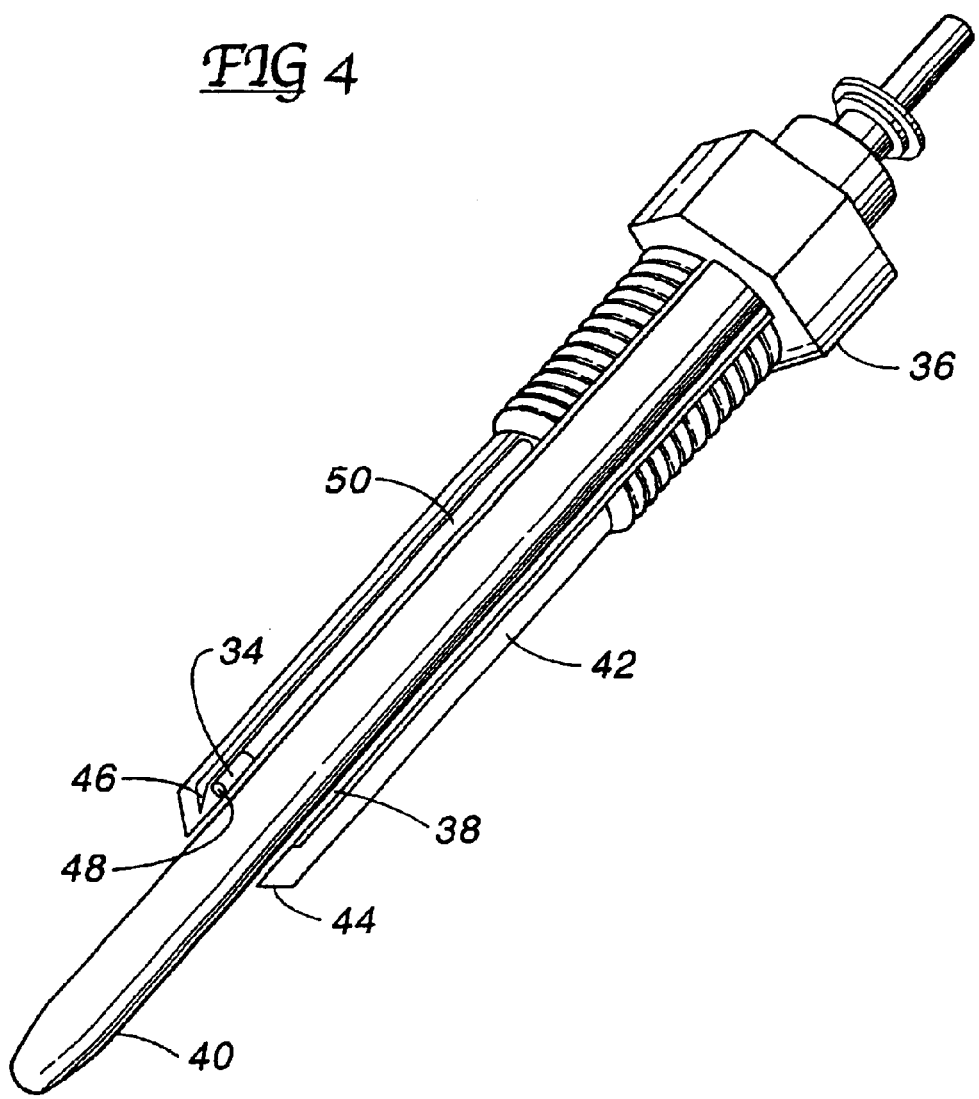

TEMPERATURE COMPENSATED FIBER-OPTIC PRESSURE SENSOR

This is a CON of Ser. No. 10/030,260, filed Apr. 12, 2000, now ABN, which is a 371 of PCT/US00/18683, filed Jul. 7, 2000.

BACKGROUND OF THE INVENTION

The field of the invention pertains to high-temperature fluid pressure sensors and, in particular, to movable diaphragm fiber-optic pressure sensors.

It is highly desirable that high-temperature pressure sensors demonstrate little or no errors associated with varying or high temperature. In particular, pressure sensors used at very high temperatures such as those encountered under combustion conditions are subject to large temperature-related errors affecting sensor offset and sensitivity accuracy. To minimize such temperature-related errors, the most accurate current sensors use water or air cooling to maintain the lowest possible equilibrium temperature. However, due to physical constraints in vehicle internal combustion engines, water or air cooling is not practical for in-vehicle testing or long term continuous engine monitoring.

A diaphragm type fiber-optic pressure sensor measures pressure by detecting light intensity changes resulting from the pressure induced diaphragm movement with respect to the sensing and delivering optical fibers. In effect, the distance between the diaphragm and the optical fibers is measured and the distance is dependent on both mechanical and optical sensor characteristics. While almost free of errors associated with temperature dependent optical fiber transmission, the sensor is subject to errors due to mechanical property changes and thermal expansion of other sensor components.

SUMMARY OF THE INVENTION

This invention further improves the technology disclosed in U.S. Pat. No. 5,600,070 issued to one of the instant applicants and teaches a high-temperature fiber-optic pressure sensor compensated for the effect of varying temperature on sensor performance. Techniques described below are aimed at correcting for the sensor sensitivity and offset dependence on temperature. By using materials of different thermal expansion coefficients for the sensor diaphragm, housing, ferrule and fiber-bonding compound and by optimizing the length of such parts, the relative distance of the fiber tip with respect to the sensing diaphragm changes in a manner that reduces sensor sensitivity and/or offset dependence on temperature.

In the first embodiment, the distance change results predominantly from controlled fiber movement within the ferrule and is used to reduce the temperature sensitivity of dynamic sensors. In the second embodiment an optimum selection of the diaphragm, housing, ferrule and bonding compound materials yields a stable fiber position within the ferrule but, instead, a well defined ferrule movement with respect to the diaphragm in response to temperature changes. The latter technique is used to reduce the offset error of static sensors or the sensitivity error of dynamic sensors.

The offset and sensitivity errors arise from fundamental material responses to temperature change. One error arises from a diaphragm's deflection increase with temperature via the temperature dependence of the Poisson number and Young's modulus. The second error is due to fiber tip movement relative to the diaphragm resulting from thermal expansion effects on the sensor structure. Those effects are due to different thermal expansion coefficients and dimensions of such sensor components as the fiber bonding compound, the ferrule, diaphragm and housing. As a consequence, a changing temperature introduces errors in the sensor output signal which may be expressed as $$V(p) = V(p_o) + (S*P)$$

and affecting both the sensor offset $V(p_o)$ and sensitivity S.

BRIEF DESCRIPTION OF THE DRAWINGS

FIG. 4 is a cutaway perspective view of a glow plug fiber-optic pressure sensor combination.

DESCRIPTION OF THE PREFERRED EMBODIMENT

Figure 1:
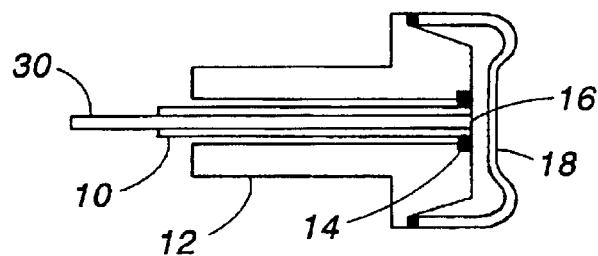
FIG. 1 is a side cross-section of a sensor wherein the ferrule is bonded to the housing adjacent the tip of the optical fiber.
Figure 2:
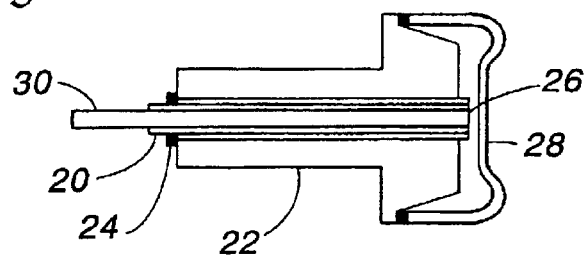
FIG. 2 is a side cross-section of a sensor wherein the ferrule is bonded to the housing a significant distance from the tip of the optical fiber.

The first embodiment of the new sensors teaches a compensation technique for dynamic sensors in which sensor sensitivity of is of primary importance. The essence of this technique is the optimization of the various sensor components' thermal expansions and dimensions. With such optimization the fiber tip-to-diaphragm distance change due to temperature change compensates for the increase in diaphragm deflection with temperature change. FIGS. 1 and 2 schematically illustrate two possible sensor head designs. In FIG. 1 the ferrule 10 and housing 12 are bonded together 14 adjacent the fiber tip 16 near the diaphragm 18. In FIG. 2 the ferrule 20 and housing 22 are bonded together 24 at the base remote from the fiber tip 26 and diaphragm 28. The sensor fiber 30, diaphragm 18, 28, ferrule 10, 20, bonding compound 14, 24 and housing 12, 22 are made of a combination of materials having different thermal expansion coefficients.

Preferably the sensors are assembled and bonded to provide a fiber tip 16 to diaphragm 18, 28 distance of 250 microns at room temperature and air pressure. As the sensor temperature increases, the sensor parts expand differentially and the fiber tip 16 to diaphragm 18, 28 distance changes in a predictable manner.

In FIG. 1 the desired distance change is mostly due to the mismatch in fiber and bonding compound 14 thermal expansion coefficients. In FIG. 2 fiber 30 movement is a combination of the in-ferrule movement as well as the ferrule displacement with respect to the diaphragm 28 due to the differences in lengths and thermal expansion coefficients of the diaphragm 28, ferrule 20 and housing 22.

Figure 3:
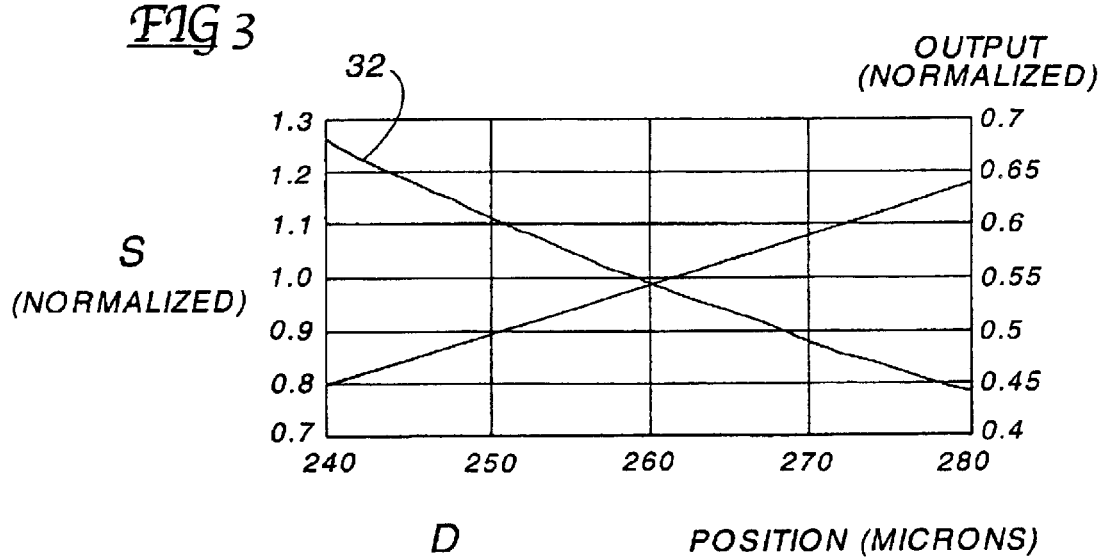
FIG. 3 is a graph of sensitivity and sensor output versus fiber tip to diaphragm distance (position p)

In these diaphragm-type pressure sensors temperature-induced fiber-to-diaphragm distance changes alter the sensor sensitivity S, increasing S with decreasing distance. The sensitivity dependence on fiber-to-diaphragm distance D is shown in FIG. 3. The sensitivity dependence on D is a function of fiber core and cladding diameters, spacing between the light delivering and collecting fibers, and their Numerical Apertures. The normalized rate of change of S, (ds/s)/dD, may be selected to be constant as it is shown at 32 in FIG. 3. Therefore the sensor diaphragm, housing ferrule and bonding compound materials and their lengths are selected such that the sensitivity decrease due to the thermally induced fiber tip 16 movement offsets the sensitivity increase due to the diaphragm deflection increase with increasing temperature.

For example, in the case of Inconel 718 diaphragm sensors, as can be easily modeled, the temperature coefficient of diaphragm deflection is approximately +0.03%/° C. resulting in the same rate of change in the sensor sensitivity. Two versions of sensitivity-compensated dynamic sensor are shown in FIGS. 1 and 2. In the version of FIG. 1 the controlled fiber tip 16 movement is by design predominately due to a mismatch in the thermal expansion of the fiber, ferrule and bonding compound. For specified ferrule and fiber materials, the bonding compound's thermal expansion and fiber-to-ferrule bonding length are selected to provide that the fiber tip 16 moves with increasing temperature effectively away from the diaphragm at a rate resulting in a sensitivity change of −0.03%/° C. The optimum bond length and material are preferably selected through finite element analysis of the sensor structure.

The second version of the sensitivity-compensated design assumes that the fiber movement is predominately due to the ferrule movement with respect to the diaphragm rather than fiber movement inside the ferrule. This approach is possible where the ferrule and housing elements are bonded at a location remote from the fiber tip 26 and diaphragm, as shown in FIG. 2, so that the differences in thermally induced parts elongation with temperature increase are significant. As in the first version, the parts characteristics are optimized for fiber-to-diaphragm distance change with temperature increase yielding the targeted sensitivity reduction.

The sensitivity change resulting from ferrule movement with respect to the diaphragm can be calculated from FIG. 3 as:

$$\Delta s/s = -0.44\%/\mu m \times \Delta l.$$

The change in Young's modulus with temperature results in a sensitivity change equal to:

$$\Delta s/s = +0.03\%/° C.\Delta T$$

By selecting the Δs/s due to ferrule movement to be opposite to that due the Young's modulus change, the error can be made to cancel. By solving for Δl the following expression can be obtained:

$$\Delta l = (0.03\%/° C.)/0.44\%/\mu m * \Delta T \, [\mu m]$$

Assuming that the sensor housing and diaphragm are made of the same material having a thermal expansion coefficient $a_{dh}$ and that the ferrule is made of a material having a thermal expansion coefficient $a_f$, the elongation difference between the two parts can be expressed approximately as:

$$\Delta l = a_{dh}L - a_f(L-D),$$

where L is the distance between the ferrule-to-housing joint location and the diaphragm, D is the distance between the fiber tip and diaphragm, and Δl is the displacement required for a nominal sensitivity change needed to offset the increase in diaphragm deflection with temperature. By solving for L the following expression can be obtained:

$$L = (\Delta l + a_f D)/(a_{ah} - a_f)$$

By solving this expression for a sensor with a stainless steel housing and an Inconel ferrule, the length L can be calculated to be 4.85 mm, a quite practical estimated dimension to implement in a high temperature pressure sensor.

Another embodiment of this invention comprises a static sensor in which the offset stability at different temperatures is of primary importance. In the sensor designs disclosed above, as shown schematically in FIGS. 1 and 2, the sensor offset stability implies that the fiber tip-to-diaphragm distance remains unchanged under varying temperatures.

In the design depicted in FIG. 1 the thermal expansion coefficients of the fibers, bonding compound and diaphragm materials are selected to provide that the fiber tip movements in the ferrule equate to the linear expansion of the diaphragm. For the design shown in FIG. 2, the optimum ferrule length L can be obtained from the above equation by substituting Δl=0 with the following result:

$$L = a_f * D/(a_{dh} - a_f)$$

To satisfy the above expression, the thermal expansion of the ferrule must exceed that of the housing/diaphragm aggregate thermal expansion.

As an example of a preferred embodiment, a miniature temperature-compensated sensor 34 is integrated with a glow plug 36 as shown in FIG. 4. The pressure sensor-glow plug combination is intended for diesel and alternative fuel engines where glow plugs are used. In such engines, high accuracy pressure data is needed for precision balancing of multiple engine cylinders, peak power control, in-cylinder estimation of air mass flow and air-fuel ratio.

Controlling these combustion parameters during engine operation transients or load changes is particularly important as such conditions are known to lead to reduced efficiency and increased emission levels. To date, the accuracy of the best uncooled cylinder pressure sensors change 3% to 5% over a typical temperature range of 100° C. encountered between idle and full load engine conditions. Such an error range is too high for a well balanced engine and results in both air mass and air-fuel ratio errors of the same magnitude.

Integrating a pressure sensor into a glow plug is particularly difficult due to three important reasons: (1) extremely limited space, (2) high temperatures and large temperature changes during glow plug operation, and (3) high levels of Electromagnetic Interference (EMI).

The new fiber-optic pressure sensor glow plug combination of FIG. 4 is directed to significantly reducing the above sensing errors in diesel and alternative fuel engines. The glow plug 36 is formed with a cylindrical channel 38 surrounding the electrode 40 and surrounded by the glow plug body 42. The sensor body is terminated by a conical sealing surface 44 having a notch 46 formed therein providing an expanded access for combustion chamber pressures to impact the fiber-optic sensor diaphragm 48. A channel 50 is formed in the sensor body 42 for the fiber-optic leads to the sensor 34.

For example, in FIG. 4 the notch 46 is 3 to 4 mm and the sensor diameter is 1.5 mm with the axis of the diaphragm of the sensor parallel to the glow plug axis. These dimensions are suitable for a modern glow plug with threads as small as M10. In order to overcome the extreme temperature tip problem (800° C.) during glow plug operation, the sensor diaphragm 48 is located in the conical 44 seating area of the glow plug body 42 of the glow plug. Owing to the heat transfer through the seating area to a cooled engine head, the maximum temperature of the sensor 34 in this area does not exceed 300° C. Pressure access is through the glow plug bore in the engine head to the cylindrical channel 38 and notch 46.

What is claimed is:

1. A fiber-optic diaphragm sensor comprising a diaphragm, a housing affixed to the diaphragm, a ferrule bonded to the housing with a bonding compound and an optical fiber within the ferrule, the optical fiber having a tip spaced from the diaphragm, the improvement comprising a selection of fiber material, diaphragm material, housing material, ferrule material and bonding compound material having at least some differing thermal expansion coefficients thereamong the materials whereby the optical fiber tip to diaphragm distance changes to compensate for any temperature change induced changes in sensor sensitivity and offset dependence.

2. The fiber-optic diaphragm sensor of claim 1 wherein the housing and ferrule are bonded together adjacent the fiber tip.

3. The fiber-optic diaphragm sensor of claim 1 wherein the housing and ferrule are bonded together at a base on the housing, the base being remote from the diaphragm.

4. The fiber-optic diaphragm sensor of claim 1 wherein the fiber tip to diaphragm distance change is substantially zero over varying temperature changes.

* * * * *